United States Patent
Lee et al.

(10) Patent No.: US 10,894,844 B2
(45) Date of Patent: Jan. 19, 2021

(54) SUPERABSORBENT POLYMER AND PREPARATION METHOD THEREOF

(71) Applicant: LG Chem, Ltd., Seoul (KR)

(72) Inventors: Yong Hun Lee, Daejeon (KR); Tae Young Won, Daejeon (KR); Jun Wye Lee, Daejeon (KR); Kwangin Shin, Daejeon (KR); Chang Hun Han, Daejeon (KR)

(73) Assignee: LG Chem, Ltd.

( * ) Notice: Subject to any disclaimer, the term of this patent is extended or adjusted under 35 U.S.C. 154(b) by 84 days.

(21) Appl. No.: 16/329,980

(22) PCT Filed: Jun. 26, 2018

(86) PCT No.: PCT/KR2018/007236
§ 371 (c)(1),
(2) Date: Mar. 1, 2019

(87) PCT Pub. No.: WO2019/022389
PCT Pub. Date: Jan. 31, 2019

(65) Prior Publication Data
US 2019/0194367 A1 Jun. 27, 2019

(30) Foreign Application Priority Data
Jul. 28, 2017 (KR) .................. 10-2017-0096361

(51) Int. Cl.
*C08J 3/24* (2006.01)
*C08J 3/075* (2006.01)
*C08J 3/12* (2006.01)
*C08F 20/14* (2006.01)
*C08K 3/18* (2006.01)
*C08K 3/22* (2006.01)
*C08K 3/28* (2006.01)
*C08K 5/092* (2006.01)
*C08K 5/109* (2006.01)
*C08K 5/103* (2006.01)
*C08K 5/00* (2006.01)
*C08K 3/00* (2018.01)
*C08K 3/011* (2018.01)

(52) U.S. Cl.
CPC .............. *C08F 20/14* (2013.01); *C08J 3/075* (2013.01); *C08J 3/12* (2013.01); *C08J 3/24* (2013.01); *C08J 3/245* (2013.01); *C08K 3/00* (2013.01); *C08K 3/011* (2018.01); *C08K 5/00* (2013.01); *C08K 5/0025* (2013.01); *C08K 5/103* (2013.01); *C08K 5/109* (2013.01); *C08J 2333/04* (2013.01)

(58) Field of Classification Search
None
See application file for complete search history.

(56) References Cited

U.S. PATENT DOCUMENTS

| 4,446,261 A | 5/1984 | Yamasaki et al. |
|---|---|---|
| 7,510,988 B2 * | 3/2009 | Wada ................. A61L 15/46 428/206 |
| 9,624,328 B2 * | 4/2017 | Won ..................... C08F 220/06 |
| 10,550,230 B2 * | 2/2020 | Lee ..................... B01J 20/321 |
| 2005/0209352 A1 | 9/2005 | Dairoku et al. |
| 2008/0075937 A1 | 3/2008 | Wada et al. |
| 2008/0119626 A1 | 5/2008 | Fujimaru et al. |
| 2009/0131255 A1 | 5/2009 | Ikeuchi et al. |
| 2009/0191408 A1 | 7/2009 | Tian et al. |
| 2010/0323885 A1 | 12/2010 | Herfert et al. |
| 2015/0307667 A1 | 10/2015 | Wada et al. |
| 2015/0315321 A1 * | 11/2015 | Won ....................... C08J 3/245 525/328.8 |
| 2015/0322188 A1 * | 11/2015 | Bauer ..................... C08F 6/008 526/240 |
| 2016/0214082 A1 | 7/2016 | Lee et al. |
| 2017/0015798 A1 | 1/2017 | Lee et al. |
| 2017/0036191 A1 | 2/2017 | Yang et al. |
| 2017/0095792 A1 | 4/2017 | Kim et al. |
| 2017/0144130 A1 | 5/2017 | Kim et al. |
| 2018/0228670 A1 | 8/2018 | Lee et al. |
| 2018/0237594 A1 | 8/2018 | Lee et al. |

FOREIGN PATENT DOCUMENTS

| EP | 1462473 A1 | 9/2004 |
|---|---|---|
| EP | 2484439 A1 | 8/2012 |
| EP | 2518092 A1 | 10/2012 |
| EP | 2905072 A1 | 8/2015 |
| JP | S56161408 A | 12/1981 |
| JP | S57158209 A | 9/1982 |
| JP | S57198714 A | 12/1982 |
| JP | 5269314 B2 | 8/2013 |
| JP | 5784286 B2 | 9/2015 |

(Continued)

OTHER PUBLICATIONS

International Search Report for PCT/KR2018/007236 dated Oct. 10, 2018.
Odian, George, Principles of Polymerization, 2nd Edition, John Wiley & Sons, copyright 1981, p. 203.
Schwalm, Reinhold, UV Coatings: Basics, Recent Developments and New Applications, Elsevier Science, Dec. 21, 2006, p. 115, ISBN-10: 0444529799.

(Continued)

*Primary Examiner* — Tae H Yoon
(74) *Attorney, Agent, or Firm* — Lerner, David, Littenberg, Krumholz & Mentlik, LLP

(57) ABSTRACT

Provided are a superabsorbent polymer having a high bulk density value and showing a reduction in unpleasant odors which may be caused by various additives included in a preparation process while basically maintaining excellent absorption performance and absorption rate, and a preparation method thereof.

9 Claims, No Drawings

(56) References Cited

FOREIGN PATENT DOCUMENTS

| JP | 2016112475 A | 6/2016 |
|----|---|---|
| KR | 20070083761 A | 8/2007 |
| KR | 100858387 B1 | 9/2008 |
| KR | 20150143167 A | 12/2015 |
| KR | 20160074204 A | 6/2016 |
| KR | 20160074206 A | 6/2016 |
| KR | 20170068384 A | 6/2017 |
| WO | WO 2006/033477 A1 * | 3/2006 |
| WO | 2012107432 A1 | 8/2012 |
| WO | 2014079694 A1 | 5/2014 |
| WO | 2017078228 A1 | 5/2017 |

OTHER PUBLICATIONS

Extended European Search Report for Application No. EP 18837432.6 dated Oct. 31, 2019, 6 pages.
Recommended Test Method: Superabsorbent Materials—Polyacrylate Superabsorbent Powders—Gravimetric Determination of Flowrate, Edana, 2002, pp. 319-324.
Third Party Observation for PCT/KR2018/007236 submitted Sep. 19, 2019, 16 pages.

\* cited by examiner

SUPERABSORBENT POLYMER AND PREPARATION METHOD THEREOF

CROSS-REFERENCE TO RELATED APPLICATIONS

This application is a national phase entry under 35 U.S.C. § 371 of International Application No. PCT/KR2018/007236, filed Jun. 26, 2018, which claims priority to Korean Patent Application No. 10-2017-0096361, filed on Jul. 28, 2017, the disclosures of which are hereby incorporated by reference herein.

TECHNICAL FIELD

The present invention relates to a superabsorbent polymer having a high flowability value and showing a reduction of unpleasant odors which may be caused by various additives included in a preparation process while basically maintaining excellent absorption performance and absorption rate, and a preparation method thereof.

BACKGROUND ART

A superabsorbent polymer (SAP) is a synthetic polymeric material capable of absorbing moisture from about 500 to 1000 times its own weight, and is also called SAM (super absorbency material), AGM (absorbent gel material), etc. Since superabsorbent polymers started to be practically applied in sanitary products, they have been widely used not only for hygiene products such as disposable diapers for children, etc., but also for water retaining soil products for gardening, water stop materials for the civil engineering and construction, sheets for raising seedling, fresh-keeping agents for food distribution fields, or the like.

As a preparation process for such superabsorbent polymers, a process by reverse phase suspension polymerization or a process by solution polymerization has been known. Of them, preparation of the superabsorbent polymer by reverse phase suspension polymerization is disclosed in, for example, Japanese Patent Laid-open Publication Nos. S56-161408, S57-158209, S57-198714, etc. Further, preparation of the superabsorbent polymer by the solution polymerization also includes a thermal polymerization method in which a water-containing gel polymer is polymerized while being broken and cooled in a kneader equipped with a plurality of shafts, and a photo-polymerization method in which an aqueous solution with a high concentration is irradiated with UV rays on a belt to be polymerized and dried at the same time.

Further, there are a variety of post-treatment processes including surface crosslinking, foaming, etc. that are in order to improve absorption-related properties of the superabsorbent polymer, such as absorbency, absorption rate, etc., and in each process, many different kinds of additives are used to achieve the purpose of the process.

However, these additives or by-products resulting from the additives may remain as they are in superabsorbent polymer particles, which are the final product, to cause unpleasant odors.

In order to solve this problem, a method has been attempted in which a separate aromatic material having a pleasant fragrance is added or a separate adsorbent material or deodorant capable of absorbing or adsorbing odor-causing molecules is added.

However, addition of the separate aromatic material may not fundamentally solve the problem, and it may cause side effects due to the separate additive material. Also, acceptance of the fragrance differs according to the preference of an individual user, and thus there is a problem that some users may have a feeling of repulsion.

Use of the separate adsorbent material or deodorant capable of absorbing or adsorbing odor-causing molecules may also cause side effects due to the separate additive material. In a dry state, the separate adsorbent material or deodorant shows an odor-reducing effect, but in a wet state, its function may be deteriorated and the odors may become relatively severe.

Further, when the absorption rate is increased by increasing porosity for the odor-reducing effect, there is a problem in that bulk density is decreased and the commercial viability is reduced.

Accordingly, there is an urgent demand for a method of preparing a superabsorbent polymer capable of reducing unpleasant odors which are caused by additives while maintaining excellent absorption-related properties.

DISCLOSURE

Technical Problem

The present invention provides a superabsorbent polymer showing reduction of unpleasant odors which are caused by additives while maintaining excellent absorption-related properties, and a method of preparing the superabsorbent polymer.

Technical Solution

The present invention provides a method of preparing a superabsorbent polymer, the method including the steps of:

A) performing crosslinking polymerization of water-soluble ethylene-based unsaturated monomers having acidic groups which are at least partially neutralized, in the presence of an internal crosslinking agent, to form a water-containing gel polymer including a crosslinked polymer;

B) drying, pulverizing, and size-sorting the water-containing gel polymer to form a base polymer powder;

C) performing surface-crosslinking of the base polymer powder by heat treatment in the presence of a surface crosslinking agent to form superabsorbent polymer particles;

D) adding an aggregation inhibitor and water to the superabsorbent polymer particles; and E) evaporating the water.

Further, the present invention provides a superabsorbent polymer including a crosslinked polymer which is obtained by polymerizing water-soluble ethylene-based unsaturated monomers having acidic groups which are at least partially neutralized, in the presence of an internal crosslinking agent, wherein the crosslinked polymer includes a surface-crosslinked layer which is modified by a surface crosslinking agent; and having powder flowability of 10 g/s or more.

The present invention also provides a superabsorbent polymer including a crosslinked polymer which is obtained by polymerizing water-soluble ethylene-based unsaturated monomers having acidic groups which are at least partially neutralized, in the presence of an internal crosslinking agent, wherein the crosslinked polymer includes a surface-crosslinked layer which is modified by a surface crosslinking agent; having bulk density of 0.55 g/ml or more; and releasing total volatile organic compounds of 2 ppm or less for 30 minutes at 100° C.

Effect of the Invention

According to a method of preparing a superabsorbent polymer of the present invention, a superabsorbent polymer showing reduction of unpleasant odors which are caused by additives while maintaining excellent absorption-related properties is provided.

DETAILED DESCRIPTION OF THE EMBODIMENTS

A method of preparing a superabsorbent polymer of the present invention may include the steps of:

A) performing crosslinking polymerization of water-soluble ethylene-based unsaturated monomers having acidic groups which are at least partially neutralized, in the presence of an internal crosslinking agent, to form a water-containing gel polymer including a crosslinked polymer;

B) drying, pulverizing, and size-sorting the water-containing gel polymer to form a base polymer powder;

C) performing surface-crosslinking of the base polymer powder by heat treatment in the presence of a surface crosslinking agent to form superabsorbent polymer particles;

D) adding an aggregation inhibitor and water to the superabsorbent polymer particles; and E) evaporating the water.

Further, the superabsorbent polymer of the present invention may include a crosslinked polymer which is obtained by polymerizing water-soluble ethylene-based unsaturated monomers having acidic groups which are at least partially neutralized, in the presence of an internal crosslinking agent, wherein the crosslinked polymer includes a surface-crosslinked layer which is modified by a surface crosslinking agent; and has powder flowability of 10 g/s or more.

The superabsorbent polymer of the present invention according to another aspect of the present invention may include a crosslinked polymer which is obtained by polymerizing water-soluble ethylene-based unsaturated monomers having acidic groups which are at least partially neutralized, in the presence of an internal crosslinking agent, wherein the crosslinked polymer includes a surface-crosslinked layer which is modified by a surface crosslinking agent; has bulk density of 0.55 g/ml or more; and releases total volatile organic compounds of 2 ppm or less for 30 minutes at 100° C.

The terminology used herein is for the purpose of describing exemplary embodiments only and is not intended to limit the present invention. The singular forms may be intended to include the plural forms as well, unless the context clearly indicates otherwise. It will be understood that the terms "comprise", "include", and "have" when used herein specify the presence of stated features, numbers, steps, components, or combinations thereof, but do not preclude the presence or addition of one or more other features, numbers, steps, components, or combinations thereof.

While the present invention is susceptible to various modifications and alternative forms, specific embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, the present invention will be described in detail.

A method of preparing a superabsorbent polymer according to an aspect of the present invention may include the steps of:

A) performing crosslinking polymerization of water-soluble ethylene-based unsaturated monomers having acidic groups which are at least partially neutralized, in the presence of an internal crosslinking agent, to form a water-containing gel polymer including a crosslinked polymer;

B) drying, pulverizing, and size-sorting the water-containing gel polymer to form a base polymer powder;

C) performing surface-crosslinking of the base polymer powder by heat treatment in the presence of a surface crosslinking agent to form superabsorbent polymer particles;

D) adding an aggregation inhibitor and water to the superabsorbent polymer particles; and E) evaporating the water.

Hereinafter, each step of the present invention will be described in detail.

(Polymerization)

First, the method of preparing the superabsorbent polymer may include the step of forming the water-containing gel polymer from water-soluble ethylene-based unsaturated monomers.

The water-soluble ethylene-based unsaturated monomer included in a monomer composition may be any monomer which is commonly used in the preparation of superabsorbent polymers. Non-limiting examples of the water-soluble ethylene-based unsaturated monomer may be a compound represented by the following Formula 1:

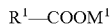 [Formula 1]

wherein, in Formula 1, $R^1$ is an alkyl group containing an unsaturated bond and having 2 to 5 carbon atoms, and $M^1$ is a hydrogen atom, a monovalent or divalent metal, an ammonium group, or an organic amine salt.

Preferably, the water-soluble ethylene-based unsaturated monomer may include one or more selected from the group consisting of acrylic acid, methacrylic acid, and a monovalent metal salt thereof, a divalent metal salt thereof, an ammonium salt thereof, and an organic amine salt thereof. When acrylic acid or a salt thereof is used as the water-soluble ethylene-based unsaturated monomer, it is advantageous in that a superabsorbent polymer having improved absorbency may be obtained.

In addition, as the water-soluble ethylene-based unsaturated monomer, maleic anhydride, fumaric acid, crotonic acid, itaconic acid, 2-acryloylethane sulfonic acid, 2-methacryloylethane sulfonic acid, 2-(meth)acryloylpropane sulfonic acid, 2-(meth)acrylamide-2-methyl propane sulfonic acid, (meth)acrylamide, N-substituted (meth)acrylate, 2-hydroxyethyl(meth)acrylate, 2-hydroxypropyl(meth)acrylate, methoxy polyethylene glycol (meth)acrylate, polyethylene glycol (meth)acrylate, (N,N)-dimethylaminoethyl (meth)acrylate, or (N,N)-dimethylaminopropyl(meth) acrylamide may be used.

Here, the water-soluble ethylene-based unsaturated monomer may have acidic groups which are at least partially neutralized. Preferably, those partially neutralized with an alkali substance such as sodium hydroxide, potassium hydroxide, ammonium hydroxide, etc. may be used.

In this regard, a degree of neutralization of the water-soluble ethylene-based unsaturated monomer may be about 40 mol % to about 95 mol %, about 40 mol % to about 80 mol %, or about 45 mol % to about 75 mol %. The range of the neutralization degree may vary depending on final physical properties. An excessively high degree of neutralization renders the neutralized monomers precipitated, and thus polymerization may not occur readily, whereas an excessively low degree of neutralization not only greatly deteriorates absorbency of the polymer but also endows the polymer with hard-to-handle properties, such as of elastic rubber.

Further, a concentration of the water-soluble ethylene-based unsaturated monomer in the monomer composition may be properly controlled, in consideration of a polymerization time and reaction conditions, and the concentration may preferably be about 20% by weight to about 90% by weight, or about 40% by weight to about 65% by weight, which is for using the gel effect during the polymerization reaction in a high-concentration aqueous solution to eliminate a need for removing unreacted monomers after the polymerization and also for improving pulverization efficiency upon a subsequent pulverization process of the polymer. However, if the concentration of the monomer is too low, a yield of the superabsorbent polymer may become low. On the contrary, if the concentration of the monomer is too high, there is a process problem in that a part of the monomers is precipitated, or pulverization efficiency is lowered upon pulverization of the polymerized water-containing gel polymer, and physical properties of the superabsorbent polymer may be deteriorated.

Meanwhile, the monomer composition may include a polymerization initiator which is generally used in the preparation of superabsorbent polymers. Non-limiting examples of the polymerization initiator may include a thermal polymerization initiator or a photo-polymerization initiator, depending on a polymerization method. However, even though the photo-polymerization is performed, a certain amount of heat is generated by UV irradiation or the like, and is also generated with an exothermic polymerization reaction. Therefore, the thermal polymerization initiator may be further included even though photo-polymerization is performed.

Here, the photo-polymerization initiator may be, for example, one or more compounds selected from the group consisting of benzoin ether, dialkyl acetophenone, hydroxyl alkylketone, phenyl glyoxylate, benzyl dimethyl ketal, acyl phosphine, and α-aminoketone. As a specific example of acyl phosphine, commercial lucirin TPO, namely, 2,4,6-trimethyl-benzoyl-trimethyl phosphine oxide, may be used. More various photo-polymerization initiators are well disclosed in "UV Coatings: Basics, Recent Developments and New Applications (Elsevier, 2007)" written by Reinhold Schwalm, p 115, which may serve as a reference.

Further, the thermal polymerization initiator may be one or more compounds selected from the group consisting of persulfate-based initiators, azo-based initiators, hydrogen peroxide, and ascorbic acid. Specific examples of the persulfate-based initiators may include sodium persulfate ($Na_2S_2O_8$), potassium persulfate ($K_2S_2O_8$), ammonium persulfate (($NH_4)_2S_2O_8$), or the like. The azo-based initiators may be exemplified by 2,2-azobis(2-amidinopropane) dihydrochloride, 2,2-azobis-(N,N-dimethylene)isobutyramidine dihydrochloride, 2-(carbamoylazo)isobutylonitril, 2,2-azobis(2-[2-imidazolin-2-yl]propane)dihydrochloride, 4,4-azobis-(4-cyanovaleric acid), or the like. More various thermal polymerization initiators are well-disclosed in "Principle of Polymerization (Wiley, 1981)" written by Odian, p 203, which may serve as a reference.

The polymerization initiator may be added at a concentration of about 0.001% by weight to about 1% by weight with respect to the monomer composition. That is, if the concentration of the polymerization initiator is too low, the polymerization rate becomes low and thus a large amount of residual monomers may be undesirably extracted from the final product. On the contrary, if the concentration of the polymerization initiator is too high, the polymer chains constituting the network become short, and thus the content of water-soluble components is increased and physical properties of the polymer may undesirably deteriorate, such as a reduction in absorption against pressure.

Meanwhile, the monomer composition includes an internal crosslinking agent to improve physical properties of the resin by polymerization of the water-soluble ethylene-based unsaturated monomers. The crosslinking agent is a crosslinking agent for internal crosslinking of the water-containing gel polymer, and the crosslinking agent is distinguished from a surface crosslinking agent for surface crosslinking of the water-containing gel polymer.

As the internal crosslinking agent, any compound is possible as long as it enables introduction of crosslinkage upon polymerization of the water-soluble ethylene-based unsaturated monomers. Non-limiting examples of the internal crosslinking agent may include multifunctional crosslinking agents, such as N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate, which may be used alone or in combination of two or more thereof, but are not limited thereto.

The internal crosslinking agent may be added at a concentration of about 0.001% by weight to 1% by weight with respect to the monomer composition. That is, if the concentration of the internal crosslinking agent is too low, the polymer may have a low absorption rate and low gel strength, undesirably. On the contrary, if the concentration of the internal crosslinking agent is too high, the polymer may have low absorption ability, which is not preferred as an absorbent.

In addition, the monomer composition may further include additives such as a thickener, a plasticizer, a preservation stabilizer, an antioxidant, etc., as needed.

Further, the monomer composition may be prepared in a solution form, in which the raw materials such as the above-described monomers, polymerization initiator, internal crosslinking agent, etc. are dissolved in a solvent. In this regard, as a usable solvent, any solvent may be used without limitations in the constitution, as long as it is able to dissolve the above-described raw materials. For example, water, ethanol, ethylene glycol, diethylene glycol, triethylene glycol, 1,4-butanediol, propylene glycol, ethylene glycol monobutyl ether, propylene glycol monomethyl ether, propylene glycol monomethyl ether acetate, methyl ethyl ketone, acetone, methyl amyl ketone, cyclohexanone, cyclopentanone, diethylene glycol monomethyl ether, diethylene glycol ethylether, toluene, xylene, butyrolactone, carbitol, methyl cellosolve acetate, N,N-dimethylacetamide, or a mixture thereof may be used as the solvent.

The formation of the water-containing gel polymer by polymerization of the monomer composition may be performed by a general polymerization method, and the process is not particularly limited. As non-limiting examples, the polymerization method is largely classified into thermal polymerization and photo-polymerization according to the polymerization energy source, and the thermal polymerization may be carried out in a reactor like a kneader equipped with agitating spindles and the photo-polymerization may be carried out in a reactor equipped with a movable conveyor belt.

For example, the monomer composition is injected to a reactor like a kneader equipped with the agitating spindles, and thermal polymerization is performed by providing hot air thereto or by heating the reactor so as to obtain the water-containing gel polymer. In this regard, the water-containing gel polymer may have a size of centimeters or millimeters when it is discharged from an outlet of the reactor, according to the type of agitating spindles equipped in the reactor. Specifically, the water-containing gel polymer may be obtained in various forms according to a concentration of the monomer composition fed thereto, a feeding speed, or the like, and the water-containing gel polymer having a (weight average) particle size of about 2 mm to about 50 mm may be generally obtained.

As another example, when the photo-polymerization of the monomer composition is carried out in a reactor equipped with a movable conveyor belt, the water-containing gel polymer may be obtained as a sheet type. In this regard, the thickness of the sheet may vary according to the concentration of the monomer composition fed thereto and the feeding speed, and the polymer sheet is preferably controlled to have a thickness of about 0.5 cm to about 5 cm in order to uniformly polymerize the entire sheet and secure production speed.

The water-containing gel polymer formed by the above method may have a water content of about 40% by weight to 80% by weight. The water content, as used herein, means a water content in the total weight of the water-containing gel polymer, which is obtained by subtracting the weight of the dry polymer from the weight of the water-containing gel polymer. Specifically, the water content may be defined as a value calculated by measuring the weight loss according to evaporation of water in the polymer during the drying process of increasing the temperature of the polymer with infrared heating. In this regard, the drying conditions are determined as follows: the temperature is increased from room temperature to about 180° C., and then the temperature is maintained at 180° C., and the total drying time is determined as about 20 minutes, including about 5 minutes for the temperature rising step.

(Drying)

The method of preparing the superabsorbent polymer includes the step of drying the water-containing gel polymer formed by the above-described step.

In this regard, to increase efficiency of the drying process, the water-containing gel polymer may be further subjected to a pulverization (coarse pulverization) step before the drying process, as needed.

Non-limiting examples of a pulverizing device applicable to the coarse pulverization may include a vertical pulverizer, a turbo cutter, a turbo grinder, a rotary cutter mill, a cutter mill, a disc mill, a shred crusher, a crusher, a chopper, a disc cutter, etc.

In this regard, the coarse pulverization may be performed so that the water-containing gel polymer has a particle size of about 2 mm to about 10 mm. That is, to increase the drying efficiency, the water-containing gel polymer is preferably pulverized to have a particle size of 10 mm or less. However, excessive pulverization may cause agglomeration between particles, and therefore, the water-containing gel polymer is preferably pulverized to have a particle size of 2 mm or more.

When the water-containing gel polymer is subjected to the coarse pulverization step before the drying step, the polymer may stick to the surface of the pulverizing device because it has high water content. In order to minimize this phenomenon, steam, water, a surfactant, an anti-agglomeration agent such as clay or silica, etc., a thermal polymerization initiator such as a persulfate-based initiator, an azo-based initiator, hydrogen peroxide, and ascorbic acid, or a crosslinking agent such as an epoxy-based crosslinking agent, a diol-based crosslinking agent, a crosslinking agent including 2-functional or 3 or more-functional acrylate, or a monofunctional crosslinking agent including a hydroxyl group may be added as needed during the coarse pulverization step.

The water-containing gel polymer coarsely pulverized or the water-containing gel polymer immediately after the polymerization is subjected to drying at a temperature of about 120° C. to about 250° C., about 150° C. to about 200° C., or about 160° C. to about 180° C. (in this regard, the temperature is defined as a temperature of a heating medium provided thereto for drying, or a temperature inside a drying reactor including the heating medium and the polymer during the drying process). When the drying temperature is low, and therefore the drying time becomes long, physical properties of the final polymer may deteriorate. In order to prevent this problem, the drying temperature is preferably 120° C. or higher. In addition, when the drying temperature is higher than necessary, only the surface of the water-containing gel polymer is excessively dried, and thus there is a concern about generation of fine powder during the subsequent pulverization process and deterioration of the physical properties of the final polymer. In order to prevent this problem, the drying temperature is preferably 250° C. or lower.

The drying time in the drying step is not particularly limited, but may be controlled from 20 minutes to 90 minutes at the above drying temperature, in consideration of the process efficiency, etc.

Furthermore, the drying method of the drying step may be any method without limitation in the constitution, as long as it may be commonly used for drying the water-containing gel polymer. Specifically, the drying step may be carried out by a method of supplying hot air, irradiating infrared rays, irradiating microwaves, irradiating ultraviolet rays, or the like.

The polymer dried by the above method may have a water content of about 0.1% by weight to about 10% by weight. When the water content of the polymer is less than 0.1% by weight, excessive drying may undesirably cause an increase of production costs and degradation of the crosslinked polymer. When the water content of the polymer is more than 10% by weight, defective products may be undesirably produced in the subsequent process.

(Pulverizing)

Next, the dried polymer is subjected to a pulverization step. The pulverization step is a step of optimizing the surface area of the dried polymer, and the step may be performed so that the pulverized polymer has a particle diameter of about 150 μm to about 850 μm.

In this regard, a pulverization device may include those commonly used, such as a pin mill, a hammer mill, a screw mill, a roll mill, a disc mill, a jog mill, or the like. Further, a step of selectively size-sorting the polymer particles obtained through the process into the polymer having a particle diameter of about 150 μm to about 850 μm may be further performed in order to manage physical properties of the superabsorbent polymer finally produced.

(Surface-Crosslinking)

The step of surface-crosslinking the polymer pulverized by the above-described step, e.g., a base polymer powder using a surface crosslinking agent, is performed.

The surface-crosslinking is a step of forming a superabsorbent polymer having more improved physical properties by inducing a crosslinking reaction of the surface of the pulverized polymer in the presence of the surface-crosslinking agent. A surface-crosslinked layer may be formed on the surface of the pulverized polymer particles by the surface-crosslinking.

The surface modification may be performed by a general method of increasing crosslinking density of the surface of the polymer particle, and for example, a solution including the surface crosslinking agent is mixed with the pulverized polymer to allow crosslinking reaction.

Here, as long as the surface-crosslinking agent is a compound that is reactive with the functional group of the polymer, it may be used without limitation in the constitution thereof.

Non-limiting example of the surface crosslinking agent may preferably include an alkylene carbonate compound having 3 to 10 carbon atoms.

Specific examples of the alkylene carbonate compound may include 1,3-dioxolan-2-one, 4-methyl-1,3-dioxolan-2-one, 4,5-dimethyl-1,3-dioxolan-2-one, 4,4-dimethyl-1,3-dioxolan-2-one, 4-ethyl-1,3-dioxolan-2-one, 4-hydroxymethyl-1,3-dioxolan-2-one, 1,3-dioxolan-2-one, 4-methyl-1,3-dioxolan-2-one, 4,6-dimethyl-1,3-dioxan-2-one, 1,3-dioxepan-2-one, etc.

Further, according to one embodiment of the present invention, the surface crosslinking agent may include a polyhydric alcohol having 2 to 10 carbon atoms, an amino alcohol having 1 to 10 carbon atoms, an oxetane compound having 2 to 10 carbon atoms, an epoxy compound having 2 to 10 carbon atoms, a polyvalent amine compound having 2 to 10 carbon atoms, calcium hydroxide, magnesium hydroxide, aluminum hydroxide, iron hydroxide, calcium chloride, magnesium chloride, aluminum chloride, and iron chloride, in addition to the above-described alkylene carbonate compounds.

According to another embodiment of the present invention, the surface crosslinking agent may include polycarboxylic acid compounds which are random copolymers derived from hydrophilic monomers such as alkoxy polyalkylene glycol mono(meth)acrylate-based monomers, including methoxy polyethylene glycol monomethacrylate (MPEGMAA), etc.; and (meth)acrylate-based monomers, including acrylic acid and (meth)acrylic acid.

Specific examples of the polycarboxylic acid compounds are disclosed in Korean Patent Publication No. 2015-0143167, etc.

A content of the surface crosslinking agent may be properly controlled according to the kind of the crosslinking agent or reaction conditions, and the content is preferably about 0.001 part by weight to about 5 parts by weight, based on 100 parts by weight of the pulverized polymer. If the content of the surface crosslinking agent is too low, surface-crosslinking may hardly occur to deteriorate physical properties of the final polymer. On the contrary, if the surface crosslinking agent is excessively used, excessive surface-crosslinking reaction may occur, leading to deterioration in absorption ability of the polymer.

The surface crosslinking agent may be added along with water. When the surface crosslinking agent is added along with water, the surface crosslinking agent may be evenly dispersed, and the penetrating depth of the surface crosslinking agent into the polymer particles may be optimized. Considering these purposes and effects, an amount of water added together with the surface crosslinking agent may be controlled to about 0.5 parts by weight to about 10 parts by weight, based on 100 parts by weight of the pulverized polymer.

In the present invention, the surface-crosslinking may be performed at a temperature of about 180° C. to about 250° C. When the surface-crosslinking is performed at the above temperature, the surface-crosslinking density may be preferably increased. More preferably, the surface-crosslinking may be performed at about 190° C. or higher, about 240° C. or lower, about 230° C. or lower, about 220° C. or lower, about 210° C. or lower, or about 200° C. or lower.

Further, the surface-crosslinking reaction may be performed for about 50 minutes or longer. That is, in order to induce the minimal surface crosslinking reaction and to prevent a reduction in physical properties due to deterioration of the polymer particles during excessive reaction, the surface-crosslinking reaction may be performed under the above-described conditions. The reaction may be performed for about 120 minutes or shorter, about 100 minutes or shorter, or about 60 minutes or shorter.

(Aging)

After the surface-crosslinking, the step of adding an aggregation inhibitor and water to the superabsorbent polymer particles on which the surface-crosslinked layer is formed, and the step of evaporating the water, may be performed.

As described above, various compounds used for the preparation of the superabsorbent polymer particles, such as surface-crosslinking agent, etc., or by-products resulting therefrom may remain as they are in the final superabsorbent polymer particles, thereby causing unpleasant odors.

Particularly, compounds used as the surface crosslinking agent may produce various by-products during the high-temperature surface-crosslinking process, and these by-products may cause unpleasant odors and may also be harmful to the human body. Thus, it is necessary to remove the by-products.

Specifically, during the preparation process of the superabsorbent polymer, various kinds of additives such as sulfur compounds, aldehyde compounds, ketone compounds, alcohol compounds, phenyl compounds, etc. are used, and these additives may cause various unpleasant odors such as a burnt smell, a synthetic rubber odor, a soldering odor, a paint odor, a hospital odor, a grass odor, a rotten egg odor, etc.

Accordingly, in the method of preparing the superabsorbent polymer of the present invention, water and an aggregation inhibitor may be added to the superabsorbent polymer particles on which the surface-crosslinked layer is formed, and then they are mixed and aged, followed by evaporating the water.

As described above, when water is added to the surface-crosslinked superabsorbent polymer, which is then aged, the compounds to be removed, e.g., odor-causing compounds which are included in the superabsorbent polymer, may be dissolved in the added water. Subsequently, when the water is evaporated, it is possible to remove the compounds to be removed.

Further, when water is added together with the aggregation inhibitor, the removal efficiency of the compounds to be removed may be increased, and powder flowability and bulk density of the final product, e.g., superabsorbent polymer particles, may also be increased.

According to one embodiment of the present invention, in the aging process, about 1 part by weight to about 10 parts by weight of water, and about 0.01 part by weight to about 1 part by weight of the aggregation inhibitor may be preferably added, based on 100 parts by weight of the surface-crosslinked superabsorbent polymer particles.

When the amount of water is too small, there is a problem in that the removal efficiency of the compounds to be removed may be decreased, and when the amount of water is too large, there is a problem in that the surface-crosslinked regions of the superabsorbent polymer particles are easily damaged, and thus physical properties such as absorption against pressure and permeability may deteriorate.

Further, when the amount of the aggregation inhibitor is too small, the removal efficiency of the compounds to be removed may be decreased, and the aggregation inhibitor may not contribute to improvement of bulk density and powder flowability of the superabsorbent polymer. When the amount of the aggregation inhibitor is too large, there is a problem in that the bulk density of the superabsorbent polymer becomes too low, and as a result, storage efficiency may be reduced, and in a subsequent process of manufacturing a product using the superabsorbent polymer, process efficiency may be reduced.

According to an embodiment of the present invention, the aggregation inhibitor may include polycarboxylic acid compounds which are random copolymers derived from hydrophilic monomers such as alkoxy polyalkylene glycol mono (meth)acrylate-based monomers, including methoxy polyethylene glycol monomethacrylate (MPEGMAA), etc., and (meth)acrylate-based monomers, including acrylic acid and (meth)acrylic acid.

Specific examples of the polycarboxylic acid compounds are disclosed in Korean Patent Publication No. 2015-0143167, etc.

In other words, the polycarboxylic acid compounds may be used along with another surface crosslinking agent during the surface-crosslinking process, and may also be added as the aggregation inhibitor during the aging process.

After adding water and the aggregation inhibitor, aging may be preferably performed at a temperature of about 50° C. to about 120° C. and a pressure of about 100 mmH$_2$O to less than about 1500 mm H$_2$O for about 5 minutes to about 2 hours, and more preferably, at a relatively low temperature of about 50° C. or higher to lower than about 100° C. and a relatively low pressure of about 100 mm H$_2$O to about 1000 mm H$_2$O or about 300 mm H$_2$O to about 800 mm H$_2$O, thereby preferably removing water and the compounds to be removed (volatile organic compounds) at the same time.

The superabsorbent polymer prepared by the above aging process may release total volatile organic compounds of about 2 ppm or less at 100° C. for 30 minutes.

(Superabsorbent Polymer)

The superabsorbent polymer prepared according to the above-described preparation method may have excellent absorption-related properties as well as reduced unpleasant odors even in a wet state.

Specifically, the superabsorbent polymer according to an aspect of the present invention may include the crosslinked polymer which is obtained by polymerizing water-soluble ethylene-based unsaturated monomers having acidic groups which are at least partially neutralized, in the presence of the internal crosslinking agent, wherein the crosslinked polymer includes the surface-crosslinked layer which is modified by a surface crosslinking agent, and may have powder flowability of 10 g/s or more.

The superabsorbent polymer according to another aspect of the present invention may include the crosslinked polymer which is obtained by polymerizing water-soluble ethylene-based unsaturated monomers having acidic groups which are at least partially neutralized, in the presence of the internal crosslinking agent, wherein the crosslinked polymer includes the surface-crosslinked layer which is modified by the surface crosslinking agent; may have bulk density of 0.55 g/ml or more; and may release total volatile organic compounds of 2 ppm or less for 30 minutes at 100° C.

According to one embodiment of the present invention, the bulk density of the superabsorbent polymer may be about 0.58 g/ml to about 0.72 g/ml, and preferably, about 0.58 g/ml to about 0.68 g/ml. The bulk density may be measured by a method described below.

The powder flowability of the superabsorbent polymer may be about 10 g/s or more, preferably about 10 g/s to about 12 g/s, or about 10 g/s to about 11.6 g/s. The powder flowability may be measured by a method described below.

When the superabsorbent polymer has high powder flowability, it may be easily transported in the production process and easily packed, which is advantageous in automatic packaging. Further, its transfer and input are also easy in a process of manufacturing a product using the prepared superabsorbent polymer.

The superabsorbent polymer according to one embodiment of the present invention may have centrifugal retention capacity (CRC) of about 25 g/g or more, and preferably, about 26 g/g to about 35 g/g.

The superabsorbent polymer according to another embodiment of the present invention may have absorption against pressure (AAP) under 0.7 psi of about 20 g/g or more, preferably about 22 g/g or more, or about 22 g/g to about 26 g/g.

Further, the superabsorbent polymer may have saline flow conductivity (SFC) of about 20 $(cm^3 \cdot s \cdot 10^{-7}/g)$ or more, preferably about 35 $(cm^3 \cdot s \cdot 10^{-7}/g)$ or more, or about 45 $(cm^3 \cdot s \cdot 10^{-7}/g)$ or more.

According to one embodiment of the present invention, when the superabsorbent polymer prepared by the above-described method is exposed to a temperature condition of about 100° C., it may release total volatile organic compounds (TVOC) of about 2 ppm or less, preferably, about 1 ppm or less, and more preferably 0.5 ppm or less for about 30 minutes, based on the unit weight of the superabsorbent polymer.

Here, the total volatile organic compounds refer to all volatile organic compounds which may be generated when the superabsorbent polymer is heated under the above conditions, and more specifically, the total amount of organic compounds which are detected between n-hexane and n-hexadecane in gas chromatography analysis using a non-polar capillary column.

The volatile organic compounds may be by-products generated from various additives under high-temperature conditions such as polymerization, drying, and surface-crosslinking processes of the superabsorbent polymer. These volatile organic compounds may remain in the superabsorbent polymer to cause unpleasant odors.

From the superabsorbent polymer according to one embodiment of the present invention, the volatile organic compounds may be eliminated along with water during the aging process, and therefore the amount of TVOCs in the polymer may be remarkably reduced. As a result, unpleasant odors of the superabsorbent polymer may be reduced, as compared with those of the existing superabsorbent polymers.

Hereinafter, the actions and effects of the present invention will be described in more detail with reference to the specific examples. However, these examples are for illustrative purposes only, and the scope of the present invention is not intended to be limited by these examples.

Example 1

Based on 100 parts by weight of acrylic acid monomer, 38.9 parts by weight of caustic soda (NaOH) and 103.9 parts by weight of water were mixed. To this mixture, 0.2 parts by weight of sodium persulfate as a thermal polymerization initiator, 0.01 parts by weight of diphenyl(2,4,6-trimethylbenzoyl)-phosphine oxide as a photopolymerization initiator, and 0.5 parts by weight of polyethylene glycol diacrylate and 0.05 parts by weight of 1,6-hexanediol diacrylate as internal crosslinking agents were added to prepare a monomer composition.

The monomer composition was irradiated with ultraviolet rays for 1 minute while flowing at a flow rate of 243 kg/h on a continuous belt polymerization reactor, in which the internal temperature was maintained at 45° C. and an ultraviolet irradiation device having an intensity of 10 mW with a mercury UV lamp light source was equipped on the upper portion, and polymerization reaction was further carried out in a non-light source state for 2 minutes.

After completion of the polymerization, a gel-type polymer sheet was primarily cut by using a shredder-type cutter, and then coarsely pulverized through a meat chopper. Subsequently, it was dried through a hot air drier at a temperature of 180° C. for 30 minutes, then pulverized using a rotary mixer, and size-sorted into 180 μm to 850 μm to prepare a base polymer.

While introducing the base polymer at a speed of 80 kg/h, 4% by weight of water, 1% by weight of ethanol, 1% by weight of ethylene carbonate, and 0.1% by weight of a polycarboxylic acid copolymer disclosed in Preparation Example 1 of Korean Patent Publication No. 2015-0143167 were continuously introduced into a high-speed mixer. The polymer which was homogeneously mixed with the surface-crosslinking solution was subjected to surface-treatment in a paddle-type mixer at 185° C. for 1 hour to prepare a superabsorbent polymer.

The surface-treated polymer was introduced at a speed of 80 kg/h, and a solution containing 3% by weight of water and 0.03% by weight of the polycarboxylic acid copolymer disclosed in Preparation Example 1 of Korean Patent Publication No. 2015-0143167 was continuously introduced into a paddle-type dryer. In this regard, the polymer was maintained at a temperature of 98° C. and a pressure of 700 mm $H_2O$ in the paddle-type dryer for 30 minutes to evaporate water, thereby obtaining a superabsorbent polymer.

Example 2

The surface-treated polymer of Example 1 was introduced at a speed of 80 kg/h, and a solution containing 2% by weight of water and 0.03% by weight of the polycarboxylic acid copolymer disclosed in Preparation Example 1 of Korean Patent Publication No. 2015-0143167 was continuously introduced into a paddle-type dryer. In this regard, the polymer was maintained at a temperature of 98° C. and a pressure of 700 mm $H_2O$ in the paddle-type dryer for 20 minutes to evaporate water, thereby obtaining a superabsorbent polymer.

Example 3

The surface-treated polymer of Example 1 was introduced at a speed of 80 kg/h, and a solution containing 4.5% by weight of water and 0.05% by weight of the polycarboxylic acid copolymer disclosed in Preparation Example 1 of Korean Patent Publication No. 2015-0143167 was continuously introduced into a paddle-type dryer. In this regard, the polymer was maintained at a temperature of 98° C. and a pressure of 700 mm $H_2O$ in the paddle-type dryer for 45 minutes to evaporate water, thereby obtaining a superabsorbent polymer.

Example 4

The surface-treated polymer of Example 1 was introduced at a speed of 80 kg/h, and a solution containing 6% by weight of water and 0.05% by weight of the polycarboxylic acid copolymer disclosed in Preparation Example 1 of Korean Patent Publication No. 2015-0143167 was continuously introduced into a paddle-type dryer. In this regard, the polymer was maintained at a temperature of 98° C. and a pressure of 700 mm $H_2O$ in the paddle-type dryer for 60 minutes to evaporate water, thereby obtaining a superabsorbent polymer.

Example 5

A superabsorbent polymer was obtained in the same manner as in Example 1, except that 0.3 parts by weight of polyethylene glycol diacrylate and 0.03 parts by weight of 1,6-hexanediol diacrylate were used as internal crosslinking agents in the monomer composition in the polymerization step of preparing the base polymer in Example 1.xxxxxxxxxxxxxxx Example 6

A superabsorbent polymer was obtained in the same manner as in Example 8, except that 0.15 parts by weight of sodium bicarbonate was additionally added to prepare the monomer composition in the polymerization step of preparing the base polymer in Example 5.

Comparative Example 1

A superabsorbent polymer was obtained in the same manner as in Example 1, except that the aging process was not performed after surface-crosslinking in Example 1.

Comparative Example 2

A superabsorbent polymer was obtained in the same manner as in Example 5, except that the aging process was not performed after surface-crosslinking in Example 5.

Comparative Example 3

A superabsorbent polymer was obtained in the same manner as in Example 6, except that the aging process was not performed after surface-crosslinking in Example 6.

Physical properties of the superabsorbent polymers prepared as above were measured according to the following methods.

Centrifugal Retention Capacity (CRC)

Centrifugal retention capacity was measured in accordance with EDANA method WSP 241.3. 0.2 g of the prepared superabsorbent polymer composition sample was put in a tea bag, and immersed in a 0.9% brine solution for 30 minutes, followed by dehydration at a centrifugal force of 250 G (gravity) for 3 minutes. Then, the amount of the absorbed brine solution was measured.

Absorption Against Pressure (AAP)

Absorption against pressure was measured in accordance with EDANA method WSP 241.3. 0.9 g of the prepared superabsorbent polymer composition sample was put in a cylinder defined in EDANA, and then pressurized with a pressure of 0.7 psi by using a piston and a weight. Then, the amount of 0.9% brine solution absorbed for 60 minutes was measured.

Saline Flow Conductivity (SFC)

SFC was measured according to a method disclosed in [0184] to [0189] of column 16 of US Patent Publication No. 2009-0131255.

Bulk Density 100 g of the superabsorbent polymer was passed through a standard flow meter orifice, and received in a 100 ml container. The volume of the superabsorbent polymer was adjusted to 100 ml by leveling the superabsorbent polymer off. The weight of only the superabsorbent polymer, excluding the container, was measured. The weight of only the superabsorbent polymer was divided by 100 ml which is the volume of the superabsorbent polymer to calculate bulk density which corresponds to the weight of the superabsorbent polymer per unit volume.

Powder Flowability

The superabsorbent polymers prepared in the examples and comparative examples were mixed well to uniformly mix the particles, and 100±0.5 g of the sample was taken and poured into a 250 ml beaker.

A density measuring cup was placed under the middle of a funnel, and then the hole of the funnel was closed. The weighed sample was lightly poured into the funnel. As soon as the closed hole of the funnel was opened, a stopwatch was started to measure the time taken for the sample to reach the bottom of the funnel.

All the procedures were carried out in a constant temperature chamber (temperature of 23±2° C., relative humidity of 45±10%).

Odor Test

Each 1 g of the superabsorbent polymers prepared in the examples and comparative examples was mixed with 2 g of 0.9 wt % brine solution, and left for 10 minutes.

The odor intensity was determined from 0 to 5, and a sensory test by human olfactory perception was performed to measure the odor intensity of each sample.

TVOC Measurement

Each 0.5 g of the superabsorbent polymers prepared in the examples and comparative examples was placed in a stainless steel tube, which was blocked with glass wool, and then heated at 100° C. for 30 minutes to generate volatile organic compounds.

The generated volatile organic compounds were concentrated onto an adsorbent tube by a cold trap, and quantitative analysis was performed by gas chromatography/mass spectrometry-thermal desorption (GC/MS-TD).

During the analysis, a dimethyl-polysiloxane column which is a non-polar column was used, while toluene at a concentration of 4 g/L was used as a standard solution, and the amount of toluene to be introduced was standardized to 4 μg, and the peaks of the organic compounds were measured.

In the chromatogram thus obtained, the entire area between n-hexane and n-hexadecane was converted into a mass unit of toluene to calculate the amount of TVOCs. The amount of the detected TVOCs (μg) was expressed as ppm, based on the amount (g) of the superabsorbent polymer used in the experiment.

The measurement results are summarized in Table 1 below.

TABLE 1

|  | CRC g/g | AAP g/g | SFC (cm$^3$·sec·$10^{-7}$/g) | Powder flowability (g/s) | Bulk density (g/ml) | Odor intensity (0~5) | TVOC (ppm) |
|---|---|---|---|---|---|---|---|
| Example 1 | 27.7 | 24.8 | 62 | 11.5 | 0.640 | 1.5 | 0.25 |
| Example 2 | 27.9 | 24.6 | 63 | 11.5 | 0.644 | 1.7 | 0.31 |
| Example 3 | 27.7 | 24.8 | 61 | 11.4 | 0.645 | 0.8 | 0.11 |
| Example 4 | 27.8 | 24.7 | 63 | 11.4 | 0.650 | 0.5 | 0.06 |
| Example 5 | 32.1 | 25.2 | 34 | 11.2 | 0.66 | 1.5 | 0.25 |
| Example 6 | 30.2 | 24.9 | 53 | 11.0 | 0.582 | 1.3 | 0.22 |
| Comparative Example 1 | 27.8 | 24.7 | 60 | 9.8 | 0.600 | 3.0 | 3.5 |
| Comparative Example 2 | 32.1 | 25.2 | 34 | 9.6 | 0.595 | 3.1 | 4.1 |
| Comparative Example 3 | 30.2 | 24.9 | 52 | 8.0 | 0.501 | 3.0 | 3.9 |

The series of experiments showed that the superabsorbent polymers according to the examples of the present invention showed remarkably low TVOC values and low odor intensities, as compared with those of the comparative examples.

Referring to Example 1 to Example 4, it was clearly confirmed that as the amount of water used in the post-treatment process after preparing the superabsorbent polymer particles in order to remove odors after surface-cross-linking was increased, the amount of TVOCs and odor intensity were decreased.

Comparisons between Example 1 and Comparative Example 1, between Example 5 and Comparative Example 2, and between Example 6 and Comparative Example 3 showed that the superabsorbent polymer particles of the examples of the present invention have excellent powder flowability and high bulk density. It is considered that these result are attributed to reduction of interparticle friction on the surface of each of the superabsorbent polymer particles by the polycarboxylic acid-based copolymer used in the present invention.

The invention claimed is:

1. A method of preparing a superabsorbent polymer, the method comprising:
   A) performing crosslinking polymerization of water-soluble ethylene-based unsaturated monomers having acidic groups which are at least partially neutralized, in the presence of an internal crosslinking agent, to form a water-containing gel polymer including a crosslinked polymer;
   B) drying, pulverizing, and size-sorting the water-containing gel polymer to form a base polymer powder;
   C) performing surface-crosslinking of the base polymer powder by heat treatment in the presence of a surface crosslinking agent to form superabsorbent polymer particles;
   D) adding an aggregation inhibitor and water to the superabsorbent polymer particles; and
   E) evaporating the water,
   wherein an aging process is performed at a temperature of 50° C. to 120° C. and a pressure of 100 mm $H_2O$ to less than 1500 mm $H_2O$ for 5 minutes to 2 hours, after adding water and the aggregation inhibitor.

2. The method of claim 1, wherein the water-soluble ethylene-based unsaturated monomer is a compound represented by the following Formula 1:

$R^1$—COO$M^1$     [Formula 1]

wherein $R^1$ is an alkyl group containing an unsaturated bond and having 2 to 5 carbon atoms, and
$M^1$ is a hydrogen atom, a monovalent or divalent metal, an ammonium group, or an organic amine salt.

3. The method of claim 1, wherein the internal crosslinking agent includes one or more of N,N'-methylenebisacrylamide, trimethylolpropane tri(meth)acrylate, ethylene glycol di(meth)acrylate, polyethylene glycol di(meth)acrylate, propylene glycol di(meth)acrylate, polypropylene glycol di(meth)acrylate, butanediol di(meth)acrylate, butylene glycol di(meth)acrylate, diethylene glycol di(meth)acrylate, hexanediol di(meth)acrylate, triethylene glycol di(meth)acrylate, tripropylene glycol di(meth)acrylate, tetraethylene glycol di(meth)acrylate, dipentaerythritol pentacrylate, glycerin tri(meth)acrylate, pentaerythritol tetraacrylate, triarylamine, ethylene glycol diglycidyl ether, propylene glycol, glycerin, or ethylene carbonate.

4. The method of claim 1, wherein the surface crosslinking agent includes alkylene carbonate having 3 to 10 carbon atoms.

5. The method of claim 4, wherein the surface crosslinking agent further includes one or more of a polyhydric alcohol having 2 to 10 carbon atoms, an amino alcohol having 1 to 10 carbon atoms, an oxetane compound having 2 to 10 carbon atoms, an epoxy compound having 2 to 10 carbon atoms, a polyvalent amine compound having 2 to 10 carbon atoms, calcium hydroxide, magnesium hydroxide, aluminum hydroxide, iron hydroxide, calcium chloride, magnesium chloride, aluminum chloride, or iron chloride.

6. The method of claim 1, wherein the surface crosslinking of the base polymer powder by heat treatment is performed at 180° C. to 250° C.

7. The method of claim 1, wherein during adding an aggregation inhibitor and water to the superabsorbent polymer particles 1 to 10 parts by weight of water and 0.01 to 0.10 parts by weight of the aggregation inhibitor are added with respect to 100 parts by weight of the surface-crosslinked superabsorbent polymer particles.

8. The method of claim 1, wherein the aggregation inhibitor includes a polycarboxylic acid-based copolymer.

9. The method of claim 1, wherein the superabsorbent polymer obtained after evaporating water releases total volatile organic compounds of 2 ppm or less at 100° C. for 30 minutes.

* * * * *